(12) United States Patent
Hefner

(10) Patent No.: US 7,493,597 B2
(45) Date of Patent: Feb. 17, 2009

(54) SYSTEM AND METHOD FOR MODEL BASED GENERATION OF APPLICATION PROGRAMMING INTERFACE TEST CODE

(75) Inventor: David Allen Hefner, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 570 days.

(21) Appl. No.: 11/063,709

(22) Filed: Feb. 23, 2005

(65) Prior Publication Data

US 2006/0190771 A1  Aug. 24, 2006

(51) Int. Cl.
*G06F 9/44* (2006.01)

(52) U.S. Cl. .................. 717/124; 717/125; 717/126; 717/127

(58) Field of Classification Search .......... 717/124–127
See application file for complete search history.

(56) References Cited

U.S. PATENT DOCUMENTS

| | | | | |
|---|---|---|---|---|
| 5,495,571 A | * | 2/1996 | Corrie et al. ................ | 714/38 |
| 5,671,231 A | * | 9/1997 | Cooper ....................... | 714/724 |
| 5,799,266 A | * | 8/1998 | Hayes ........................ | 702/123 |
| 5,864,660 A | * | 1/1999 | Hamameh et al. ............. | 714/32 |
| 6,219,829 B1 | * | 4/2001 | Sivakumar et al. .......... | 717/131 |
| 6,618,852 B1 | * | 9/2003 | van Eikeren et al. ........ | 717/108 |
| 6,804,634 B1 | * | 10/2004 | Holzmann et al. ............. | 703/2 |
| 7,000,224 B1 | * | 2/2006 | Osborne et al. ............. | 717/125 |
| 2002/0029377 A1 | * | 3/2002 | Pavela ........................ | 717/124 |
| 2002/0069099 A1 | * | 6/2002 | Knox et al. .................... | 705/8 |
| 2003/0196190 A1 | * | 10/2003 | Ruffolo et al. .............. | 717/124 |
| 2005/0235263 A1 | * | 10/2005 | Bundy et al. ................ | 717/124 |

* cited by examiner

*Primary Examiner*—Wei Y Zhen
*Assistant Examiner*—Junchun Wu
(74) *Attorney, Agent, or Firm*—Woodcock Washburn LLP

(57) ABSTRACT

Systems and methods for model based generation of API test code are disclosed. A number of interfaces are employed to enable flexible and extensible visual representations of test parameter input data. One such interface may enable diagramming of a test model that depicts sequencing dependencies among a set of API's to be tested. The test model may be sliced into test cases in accordance with the sequencing dependencies and, for each test case, a linear sequence of API test code may be generated.

16 Claims, 12 Drawing Sheets

Fig. 1a

API Specification 100a

Test Function Definitions
Int Func A (intW, intX)
Int Func B (intY, intZ)
Int Func C (intA)

Sequencing Dependencies
Func A → Func B
Func B → Func A
Func B → Func B
Func A → Func C

Argument Configurations
Func A
    argument W {0, 3, 9, 2}
    argument X {42, 94}

Func B
    argument Y {1, 6, 12}
    argument Z {8, 14}

Func C
    argument A {39, 57}

Fig. 1b

API Specification 100b

Test Function Definitions
Int Func A (intW, intX)
Int Func B (intY, intZ)
Int Func C (intA)

Sequencing Dependencies
Func A → Func B
Func B → Func A
Func B → Func B (y = 6)
Func B → Func A → Func A → Func B
Func A → Func B → Func A Argument Configurations
Func A
    argument W {0, 3, 9, 2}
    argument X {42, 94}

Func B
    argument Y {1, 6, 12}
    argument Z {8, 14}

Func C
    argument A { 39, 57 }

```
┌─────────────────────────────────────────────┐
│              Property Sheet 203             │
│                                             │
│                                             │
│  Function A                                 │
│        argument W {0, 3, 9, 2}              │
│        argument X {42, 94}                  │
│                                             │
│  Function B                                 │
│        argument Y {1, 6, 12}                │
│        argument Z {8, 14}                   │
│                                             │
│  Function C                                 │
│        argument A { 39, 57 }                │
│                                             │
└─────────────────────────────────────────────┘
```

SYSTEM AND METHOD FOR MODEL BASED GENERATION OF APPLICATION PROGRAMMING INTERFACE TEST CODE

FIELD OF THE INVENTION

The present invention relates to the field of testing and development, and, more specifically, to the testing and development of application programming interfaces.

BACKGROUND OF THE INVENTION

The testing and development of application programming interfaces (API's) differs from that of the testing and development of software programs, since APIs are not complete software programs. Rather, API's are components that are used to develop and become part of complete software programs. Software program testing may involve the use of model based techniques, in which complete executable software programs are modeled to test particular software programs. API development is driven by an API specification that contains detailed information about each function, their parameters, return values and calling or sequencing constraints. API testing, on the other hand, is driven by the API specification and the API test specification. API testing involves the use of linear source code sequences that test the API's in controlled contexts. These controlled contexts are based on a number of test parameters and sequences, which are typically defined in the API test specification.

The API test specification may define a number of test functions and test variables with which to test the API. The API test specification also may reflect sequencing dependencies that are defined in the API specification. The test specification may also specify a number of conditions which must be satisfied to proceed though each test sequence. If the API specification defines allowable argument configurations for each API, the test specification typically reflects those argument configurations along with other argument configurations designed to test error handling.

In conventional API development processes, a test developer will use the API specification to manually generate test code for the API. For a number of reasons, this manual generation of test code is often a time consuming and tedious task. One reason is that typical API specifications may define large quantities of functions with highly complex sequencing dependencies and arguments, as well as a number of conditions that are required to proceed through each sequence. Furthermore, while conventional tools may be used by a developer to generate visual representations of the test parameters, there are no conventional tools that are capable of reading and interpreting visual representations to generate test code. For example, conventional diagramming tools such as, for example, Microsoft Visio™ from MICROSOFT Corp. of Redmond, Wash., may be used to diagram the sequencing dependencies among the test functions defined in an API specification. However, there is no conventional tool that is capable of reading and interpreting such a diagram, structurally manipulating the information therein, and using the information to generate API test code. Furthermore, while conventional word processors and spreadsheets may be used to specify argument configurations for the functions, there is no conventional tool that is capable of reading and interpreting a word processor or spreadsheet file, manipulating the information therein, and using the information to generate API test code. Accordingly, there is a need in the art for model based generation of API test code.

SUMMARY OF THE INVENTION

The present invention is directed to systems and methods for model based generation of API test code. The present invention improves productivity by employing a number of interfaces that enable flexible and extensible visual representations of test parameters. The use of these multiple interfaces enables each aspect of the test parameters to be represented in a convenient and efficient manner. The test parameters may include sequencing dependencies, argument configurations, and possibly other context information for a specified set of test functions. The present invention further improves productivity by automatically reading and interpreting the test parameter representations and using them to generate linear sequences of API test code.

According to an aspect of the invention, a diagramming interface is provided that enables an API test model to be generated. The test model depicts a visual representation of the sequencing dependencies for the test functions. Another interface such as a word processor or spreadsheet interface may be provided that enables a test property sheet to be generated. The test property sheet includes the argument configurations and possibly other test parameters.

According to another aspect of the invention, the test model and the property sheet are forwarded to a test code generator. The test code generator automatically reads and interprets the test model and slices the test model into test cases in accordance with the sequencing dependencies. The test code generator also reads and interprets the property sheet and uses the information therein to generate a linear sequence of test code for each test case. The test code generator may also generate a test plan that describes how the test code will be implemented to test the API.

Additional features and advantages of the invention will be made apparent from the following detailed description of illustrative embodiments that proceeds with reference to the accompanying drawings.

BRIEF DESCRIPTION OF THE DRAWINGS

The illustrative embodiments will be better understood after reading the following detailed description with reference to the appended drawings, in which:

FIGS. 1a and 1b depict exemplary API specifications in accordance with the present invention;

FIG. 4 depicts an exemplary property sheet in accordance with the present invention;

DETAILED DESCRIPTION OF ILLUSTRATIVE EMBODIMENTS

The subject matter of the present invention is described with specificity to meet statutory requirements. However, the description itself is not intended to limit the scope of this patent. Rather, the inventors have contemplated that the claimed subject matter might also be embodied in other ways, to include different acts or elements similar to the ones described in this document, in conjunction with other present or future technologies.

Generally, the present invention uses a set of input test parameters to generate linear sequences of application program interface (API) test code. As described above, the test parameters for an API may be specified in or derived from an API specification. FIGS. 1a and 1b depict exemplary API specifications in accordance with the present invention. Referring to FIG. 1a, API specification 100 includes a "Function Definition" section that defines three test functions, integer Func A, integer Func B, and integer Func C. Test functions A and B each include a pair of test parameters, intW and intX for Func A, and intY and intZ for Func B. Test function C includes a single integer test parameter, int A. In addition to integers, other types of functions and variables such as, for example, Boolean functions and variables, may be included in API specification 100. The "Sequencing Dependencies" section defines the appropriate ordered relationships among the test functions. In particular, Func A may precede Func B, Func B may precede Func A, and Func B may precede itself. The "Argument Configurations" section defines a set of allowable values for each test variable. All possible argument values need not appear in the argument configurations. Rather, the arguments may be reduced to sets of equivalent values that, produce substantially similar results for testing and development purposes.

Referring now to FIG. 1b, API specification 100b is similar to API specification 100a except that API specification 100b has a slightly more complex set of sequencing dependencies. Specifically, API specification 100b defines five sequencing dependencies. The first three of these sequencing dependencies are also listed within in API specification 100a, while the last two are unique to API specification 100b. Additionally, API specification 100b includes a condition, y=6, which must be satisfied to proceed through the sequence Func B to Func B. While API specifications 100a and 100b include relatively simplistic test parameters, the test parameters common in the art may be much more complex.

Figure 2:
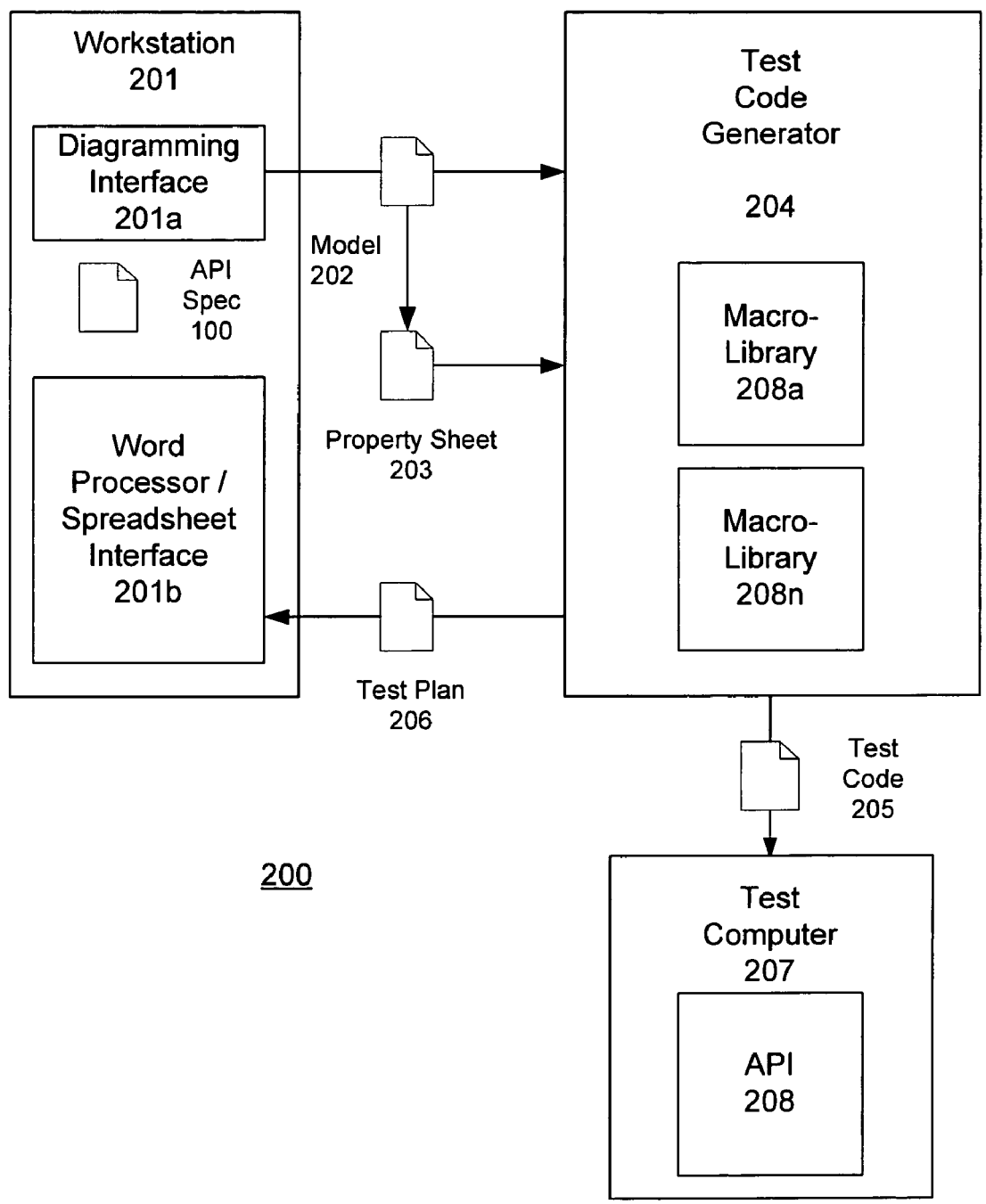
FIG. 2 depicts an exemplary system for providing API test code in accordance with the present invention.

Referring now to FIG. 2, system 200 enables the test parameters specified in or derived from an API specification 100 to be used to generate API test code. Workstation 201 includes interfaces 201a and 201b which enable each aspect of the test parameters to be represented in a convenient and efficient manner. In particular, diagramming interface 201a may be used to generate a test model 202, which depicts the sequencing dependencies among the test functions. Diagramming interface 201a may be a diagramming tool such as, for example, Microsoft ViSio™ from MICROSOFT Corp. of Redmond, Wash. In addition to diagramming interface 201a, word processor/spreadsheet interface 201b may be used to generate property sheet 203. Property sheet 103 includes the argument configurations for each test function and possibly other test parameters. Word processor/spreadsheet interface 201b may be, for example, the word processor Microsoft Word™ or the spreadsheet Microsoft Excel™, both from the above-mentioned MICROSOFT Corp.

Figure 3A:
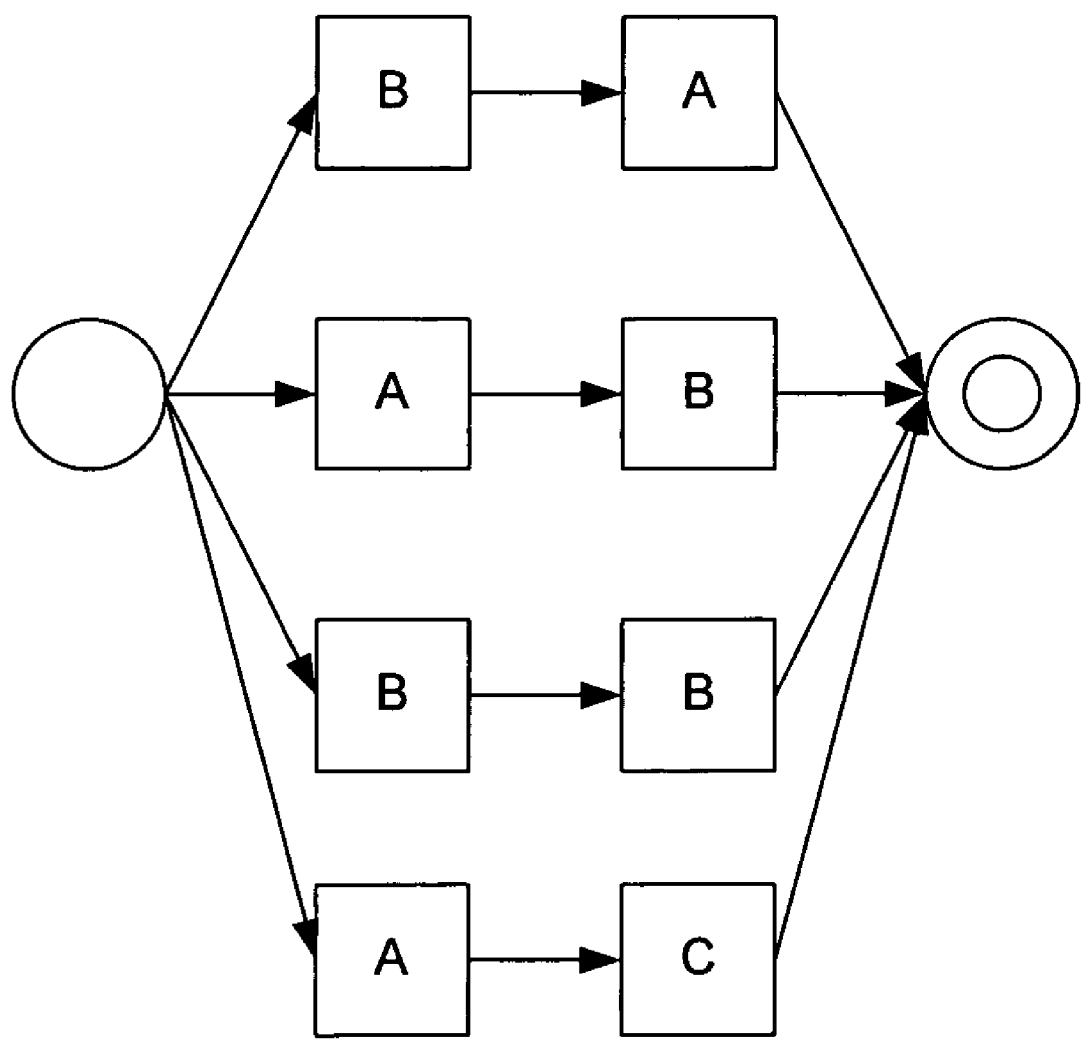
FIGS. 3a and 3b depict exemplary test models in accordance with the present invention.
Figure 3B:
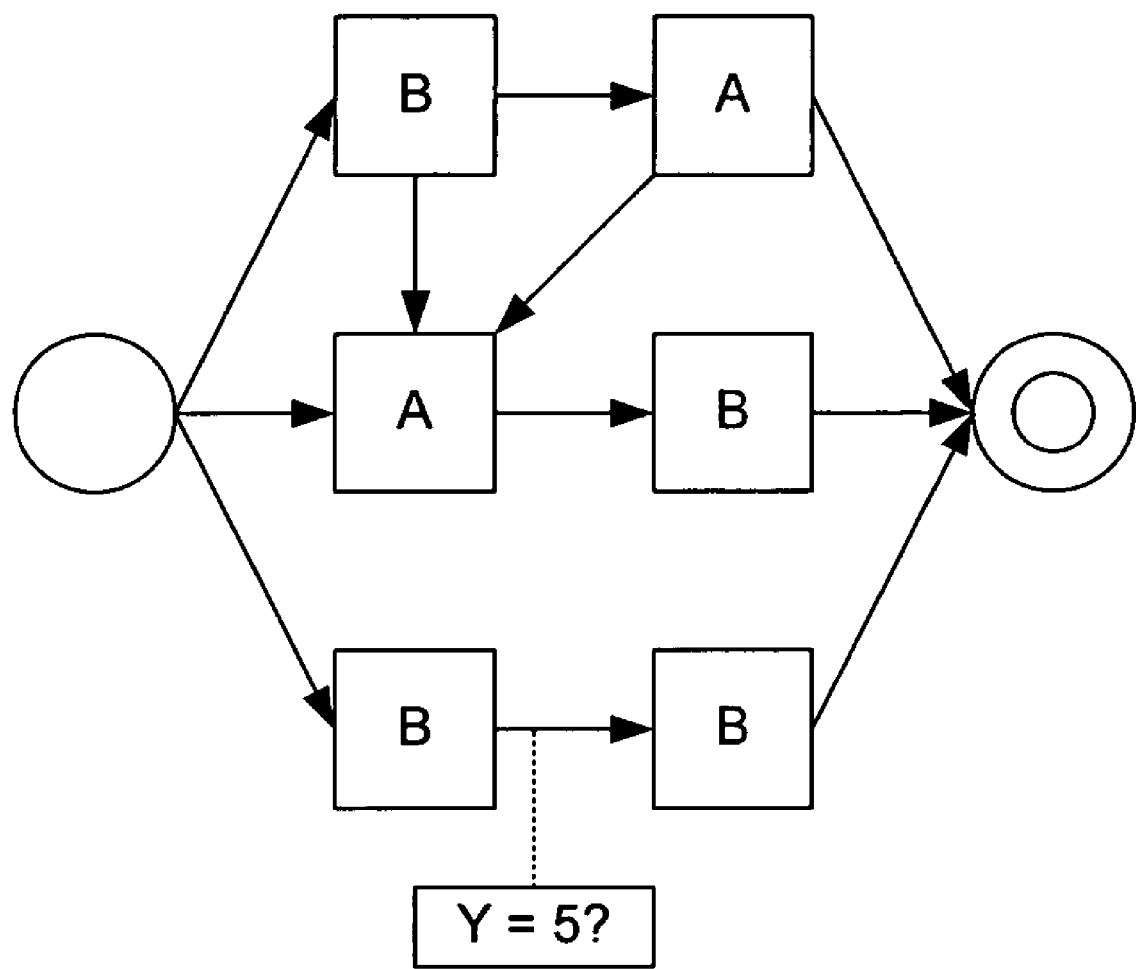

Exemplary test models 202a and 202b are depicted in FIGS. 3a and 3b, respectively. Referring now to FIG. 3a, test model 202a depicts the sequencing dependencies listed in API specification 100a of FIG. 1a. Test model 202a depicts four horizontal paths from the start node shown on the far left to the end node shown on the far right. Referring now to FIG. 3b, test model 202b depicts the sequencing dependencies listed in API specification 100b of FIG. 1b. Test model 202b depicts five paths, including the three horizontal paths common to both API specifications 100a and 100b and also two cross connected paths unique to API specification 100b. One cross connected path depicts the sequence Func B to Func A to Func B, while the other cross connected path depicts the sequence Func B to Func A to Func A to Func B. Test model 202b also depicts the condition, y=6, which is unique to API specification 100b. While test models 202a and 202b are relatively simplistic, diagramming tool 201a may be used to generate test models depicting any number of sequencing dependencies with any number of functions, variables, and conditions. In addition to integer functions and variables, diagramming tool 201a may be used to depict other functions and variables such as, for example, Boolean logic.

Referring now to FIG. 4, exemplary property sheet 203 includes the argument configurations common to both API specifications 100a and 100b. As should be appreciated, providing both diagramming interface 201a and word processor/spreadsheet interface 201b enables the sequencing dependencies and argument configurations to be separated and represented using interfaces that are more convenient and efficient for each. Diagramming interface 201a and word processor/spreadsheet interface 201b need not necessarily run on the same workstation 201, as test model 202 and property sheet 203 may be generated at any remote computing device connected over a local area network (LAN) or a wide area network (WAN) such as, for example, the Internet.

Figure 5:
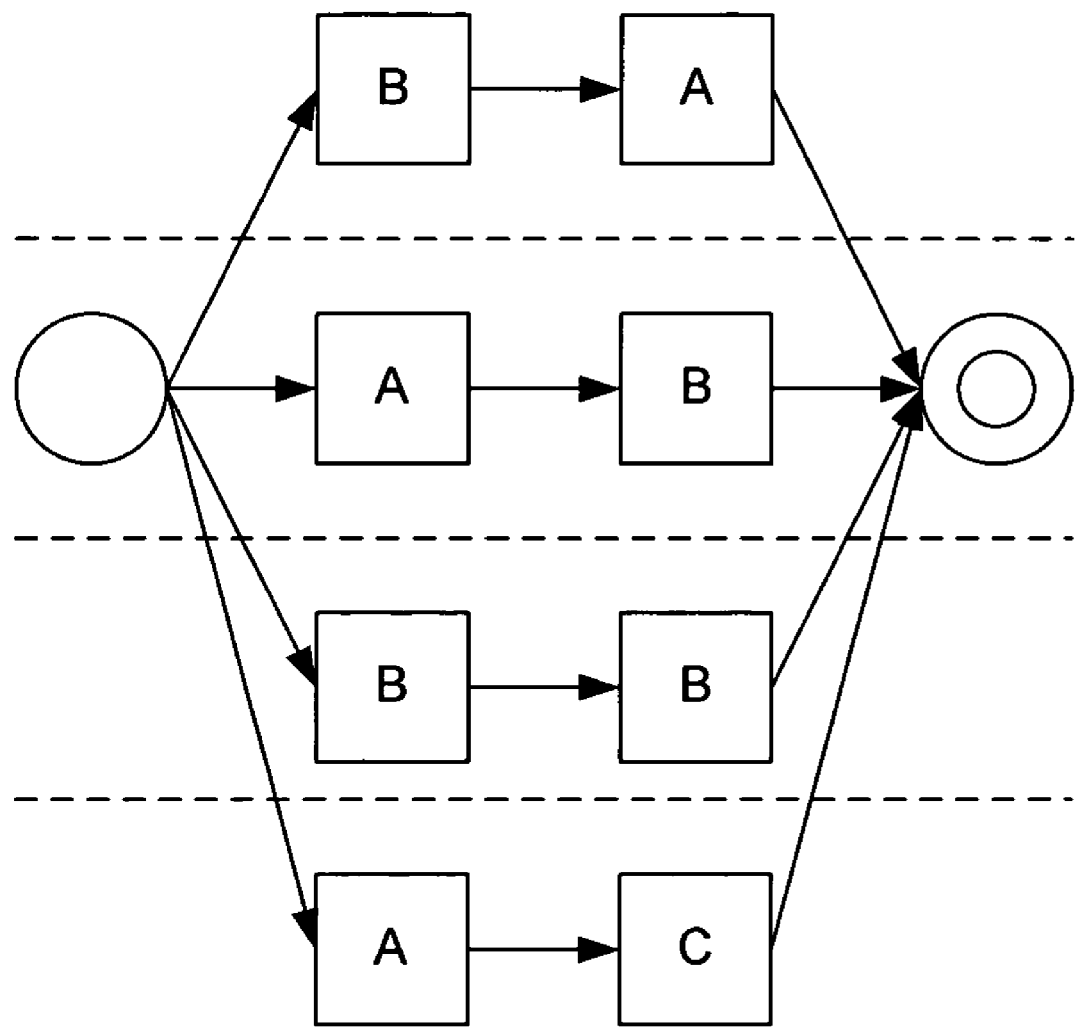
FIG. 5 depicts an exemplary slicing of a model in accordance with the present invention.
Figure 6A:
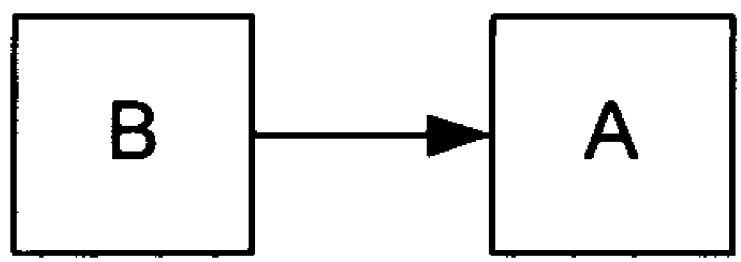
FIGS. 6a and 6b depict exemplary sets of test cases in accordance with the present invention.
Figure 6A:
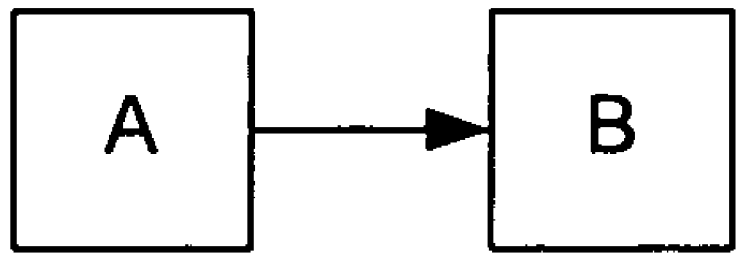
Figure 6A:
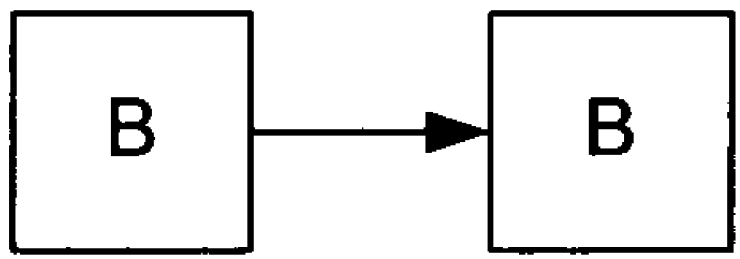
Figure 6A:
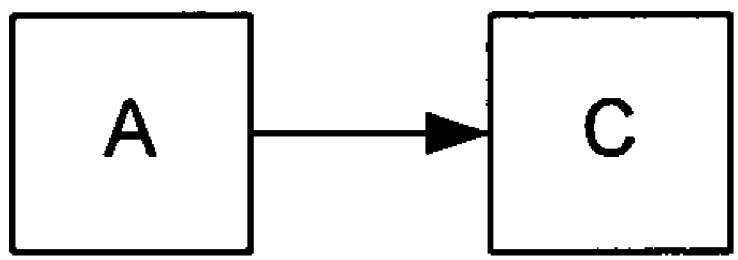

Once the test parameter representations 202 and 203 are generated, they are forwarded to test code generator 204, which is an application that may run at workstation 201 or at any connected computing device. Test code generator 204 reads and interprets the test parameter representations 202 and 203 and uses the information therein to generate linear sequences of API test code 205. Specifically, test code generator 204 reads and interprets test model 202 and slices test model 202 into a number of test cases. FIG. 5, depicts an exemplary representation of how test model 202a of FIG. 3a may be sliced to generate four test cases. Each test case includes a sequence of test functions that correspond to a complete path from the start node to the end node. Referring now to FIG. 6a, test case set 600a includes the three test cases generated by slicing test model 202a in the manner depicted by FIG. 5.

Figure 6B:
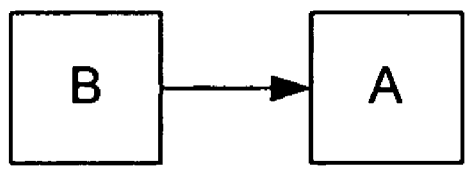
Figure 6B:
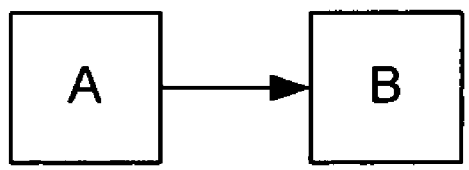
Figure 6B:
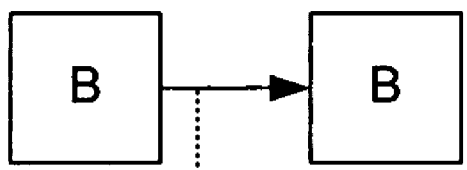
Figure 6B:
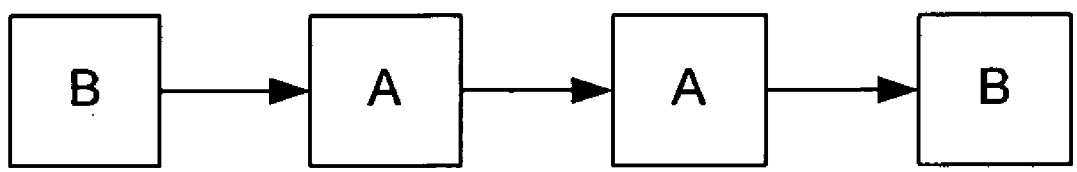
Figure 6B:
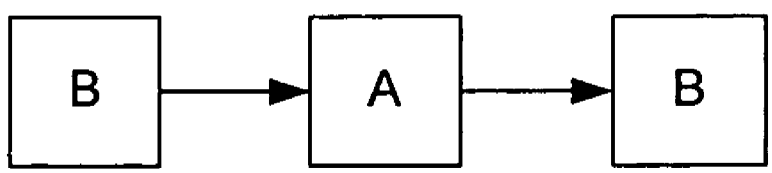

While FIG. 5 depicts four horizontal slices, it should be noted that each test case need not necessarily correspond to a horizontal slice of a test model 202. For example, as test model 202b of FIG. 3b includes two non-horizontal cross connection paths, a slicing of test model 202b will produce two non-horizontal slices. Referring now to FIG. 6b, test case set 600b includes five cases generated by slicing test model 202b of FIG. 3b. The top three test cases shown in set 600b are horizontal test cases that correspond to the three horizontal paths of test model 202b. The bottom two test cases shown in set 600b are non-horizontal test cases that correspond to the two cross connection paths of test model 202b. The third test case shows the condition y=6, which has been carried over from test model 202b.

Once the test model 202 has been sliced into test cases, test code generator 204 uses the information within property sheet 203 to generate a linear sequence of test code 205 for each test case. The test code 205 may be written in a programming language such as C or C# or any other language suitable for the testing and development of API 208. In particular, test code generator 204 uses the argument configurations within property sheet 203 to generate test code 205 that tests each possible argument value or equivalent values thereof for each test case. As the sequencing dependencies and argument configurations may be large and complex, the resulting test code 205 may also include a great many complex sequences. Additionally, test code generator 204 may generate test code 205 in accordance with each condition specified within the test model 202. If a condition is not satisfied, there may be an underlying error or bug that is responsible. In this scenario, test code 205 may generate an error message or another alert to notify a developer that a condition has failed. The alert may be displayed at workstation 101 and/or another connected computing device.

Test code generator 204 may reference information stored in a number of customizable macro-libraries 209*a-n* as part of the test code generation process. For example, test code 205 may begin with a header file that includes a prolog section. This prolog section is typically a portion of code with several lines of text that includes information unique to particular components of the system 200 such as, for example, test computer 207 and/or API 208. Test code generator 204 enables a developer or other user to customize the prolog and/or any other appropriate section of test code 205 prior to the test code generation process. This customized code may then be stored and indexed within the customizable macro-libraries 209*a-n*. In this manner, any time code is generated for execution within the testing environment, test code generator 204 may reference information from within macro-libraries 209*a-n* and include such information within the resulting test code 205. Thus, the referenced information need only be supplied to the test code generator 204 a single time to be used repeatedly in each iteration of test code generation. If desired, for any particular iteration of test code generation, any of the macro-libraries 209*a-n* may be overridden and the corresponding information may be provided manually to test code generator 204.

In addition to test code 205, test code generator 204 may also generate a test plan 206, which describes how test code 205 will be implemented to test API 208. Test plan 206 is preferably an electronic document that is suitable for display via word processor/spreadsheet interface 201*b*. Test plan 206 is preferably written in a natural language such as English and may include a number of charts and/or diagrams. Prior to the implementation of test code 205, test plan 206 may be reviewed and analyzed by a number of developers to ensure that test code 205 has been generated in an appropriate manner that conforms with the test parameters and other requirements specific to API 208. This review may include a check for any bugs or errors and may also present a final opportunity to determine if any of the input parameters need to be updated prior to the actual execution of the test code 205 at test computer 207. If any problems or necessary updates are identified during this review, test model 202 and/or property sheet 203 may be adjusted accordingly and re-submitted to test code generator 204, and the slicing and test code generation processes may be repeated with the adjusted information.

Once the test plan has been reviewed and is determined to be satisfactory, the test code may be forwarded to test computer 207 for execution. As should be appreciated, test computer 207 need not necessarily be a separate computing device. In fact, test computer 207 and workstation 201 may be a single computing device that also supports test code generator 204. If desired, the test code may be stored and indexed at test code generator 204 for future use on any computing device or any API with similar characteristics.

Figure 7:
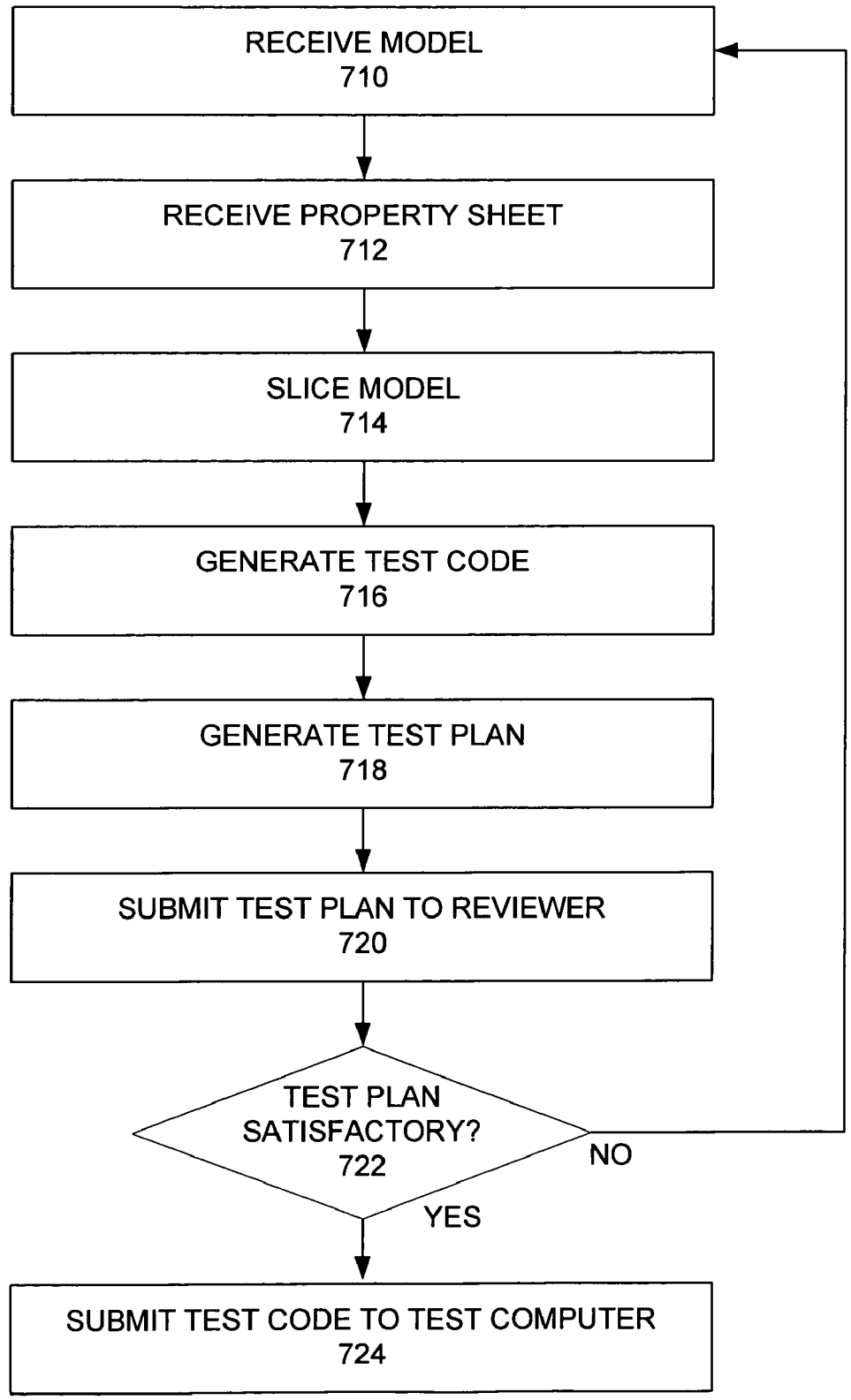
FIG. 7 depicts a flowchart of an exemplary method for providing API test code in accordance with the present invention.

A flowchart of an exemplary method for providing API test code in accordance with the present invention is shown in FIG. 7. At act 710, test code generator 204 receives test model 202 from diagramming interface 201*a*. As described above with reference to FIGS. 3*a* and 3*b*, test model 202 provides a visual representation of sequencing dependencies among a group of test functions. At act 712, test code generator 204 receives property sheet 203 from diagramming interface 201*b*. As described above with reference to FIG. 4, property sheet 203 provides a visual representation of argument configurations and possibly other test parameters. At act 714, test code generator 204 slices test model 202 in accordance with the sequencing dependencies. The test model 202 is sliced into a set of test cases such as, for example, those depicted in FIGS. 6*a* and 6*b*. At act 716, test code generator 204 uses the argument configurations and possibly other test maneuvers received at step 712 to generate a linear sequence of test code 205 for each resulting test case. At act 718, test code generator 204 generates a test plan 206 that describes how test code 205 will be implemented to test API 208. The test plan 206 may be reviewed by a developer or another user to determine whether the test code 205 is satisfactory and ready for testing at test computer 207. At act 720, test code generator 204 receives an indication of whether the test plan 206 is satisfactory. If a non-satisfactory indication is received, then the input parameters may be adjusted, an updated test model 202 and property sheet 203 may be generated and submitted to test code generator 204, and the process may be repeated with the updated parameters. If a satisfactory indication is received, then, at act 724, the test code 205 may be submitted to test computer 207 for execution.

As is apparent from the above, all or portions of the various systems, methods, and aspects of the present invention may be embodied in hardware, software, or a combination of both. When embodied in software, the methods and apparatus of the present invention, or certain aspects or portions thereof, may be embodied in the form of program code (i.e., instructions). This program code may be stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer or server, the machine becomes an apparatus for practicing the invention. A computer on which the program code executes will generally include a processor, a storage medium readable by the processor (including volatile and non-volatile memory and/or storage elements), at least one input device, and at least one output device. The program code may be implemented in a high level procedural or object oriented programming language. Alternatively, the program code can be implemented in an assembly or machine language. In any case, the language may be a compiled or interpreted language.

The present invention may also be embodied in the form of program code that is transmitted over some transmission medium, such as over electrical wiring or cabling, through fiber optics, over a network, including a local area network, a wide area network, the Internet or an intranet, or via any other form of transmission, wherein, when the program code is received and loaded into and executed by a machine, such as a computer, the machine becomes an apparatus for practicing the invention.

When implemented on a general-purpose processor, the program code may combine with the processor to provide a unique apparatus that operates analogously to specific logic circuits.

Moreover, the invention can be implemented in connection with any computer or other client or server device, which can be deployed as part of a computer network, or in a distributed computing environment. In this regard, the present invention pertains to any computer system or environment having any number of memory or storage units, and any number of applications and processes occurring across any number of storage units or volumes, which may be used in connection with processes for persisting objects in a database store in accordance with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

Distributed computing facilitates sharing of computer resources and services by exchange between computing devices and systems. These resources and services include, but are not limited to, the exchange of information, cache storage, and disk storage for files. Distributed computing takes advantage of network connectivity, allowing clients to leverage their collective power to benefit the entire enterprise. In this regard, a variety of devices may have applications, objects or resources that may implicate processing performed in connection with the object persistence methods of the present invention.

Figure 8:
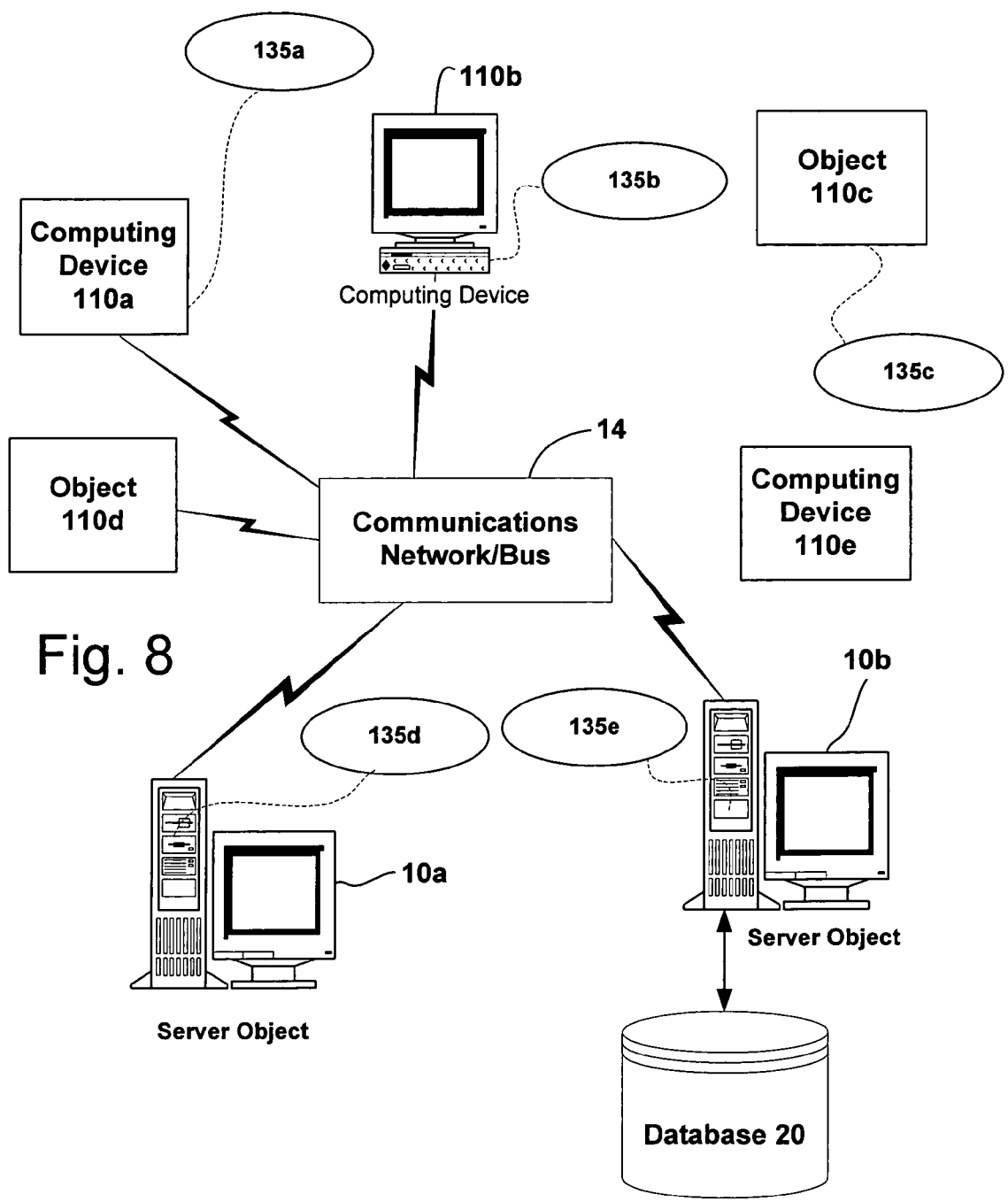
FIG. 8 is a block diagram representing an exemplary network environment having a variety of computing devices in which the present invention may be implemented.

FIG. 8 provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, personal computers, etc. Each object can communicate with another object by way of the communications network 14. This network may itself comprise other computing objects and computing devices that provide services to the system of FIG. 8, and may itself represent multiple interconnected networks. In accordance with an aspect of the invention, each object 10a, 10b, etc. or 110a, 110b, 110c, etc. may contain an application that might make use of an API, or other object, software, firmware and/or hardware, to request use of the processes used to implement the object persistence methods of the present invention.

It can also be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides the infrastructure for widely distributed computing and encompasses many different networks. Any of the infrastructures may be used for exemplary communications made incident to the present invention.

The Internet commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers executing networking protocols that allow users to interact and share information over the network (s). Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 8, computers 110a, 110b, etc. can be thought of as clients and computer 10a, 10b, etc. can be thought of as servers, although any computer could be considered a client, a server, or both, depending on the circumstances. Any of these computing devices may be processing data in a manner that implicates the object persistence techniques of the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the persistence mechanism of the invention may be distributed across multiple computing devices.

Client(s) and server(s) may communicate with one another utilizing the functionality provided by a protocol layer. For example, Hypertext Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over any available communications medium.

Thus, FIG. 8 illustrates an exemplary networked or distributed environment, with a server in communication with client computers via a network/bus, in which the present invention may be employed. The network/bus 14 may be a LAN, WAN, intranet, the Internet, or some other network medium, with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to maintain a persisted object.

In a network environment in which the communications network/bus 14 is the Internet, for example, the servers 10a, 10b, etc. can be servers with which the clients 110a, 110b, 110c, 110d, 110e, etc. communicate via any of a number of known protocols such as HTTP. Servers 10a, lob, etc. may also serve as clients 110a, 110b, 110c, 110d, 110e, etc., as may be characteristic of a distributed computing environment.

Communications may be wired or wireless, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 10a, 10b, etc. may be equipped with various application program modules or objects 135 and with connections or access to various types of storage elements or objects, across which files or data streams may be stored or to which portion(s) of files or data streams may be downloaded, transmitted or migrated. Any computer 10a, 10b, 110a, 110b, etc. may be responsible for the maintenance and updating of a database, memory, or other storage element 20 for storing data processed according to the invention. Thus, the present invention can be utilized in a computer network environment having client computers 110a, 110b, etc. that can access and interact with a computer network/bus 14 and server computers 10a, 10b, etc. that may interact with client computers 110a, 110b, etc. and other like devices, and databases 20.

FIG. 8 and the following discussion are intended to provide a brief general description of a suitable computing device in connection with which the invention may be implemented. For example, any of the client and server computers or devices illustrated in FIG. 8 may take this form. It should be understood, however, that handheld, portable and other computing devices and computing objects of all kinds are contemplated for use in connection with the present invention, i.e., anywhere from which data may be generated, processed, received and/or transmitted in a computing environment. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the object persistence methods of the invention.

Although not required, the invention can be implemented via an operating system, for use by a developer of services for a device or object, and/or included within application or server software that operates in accordance with the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like.

Figure 9:
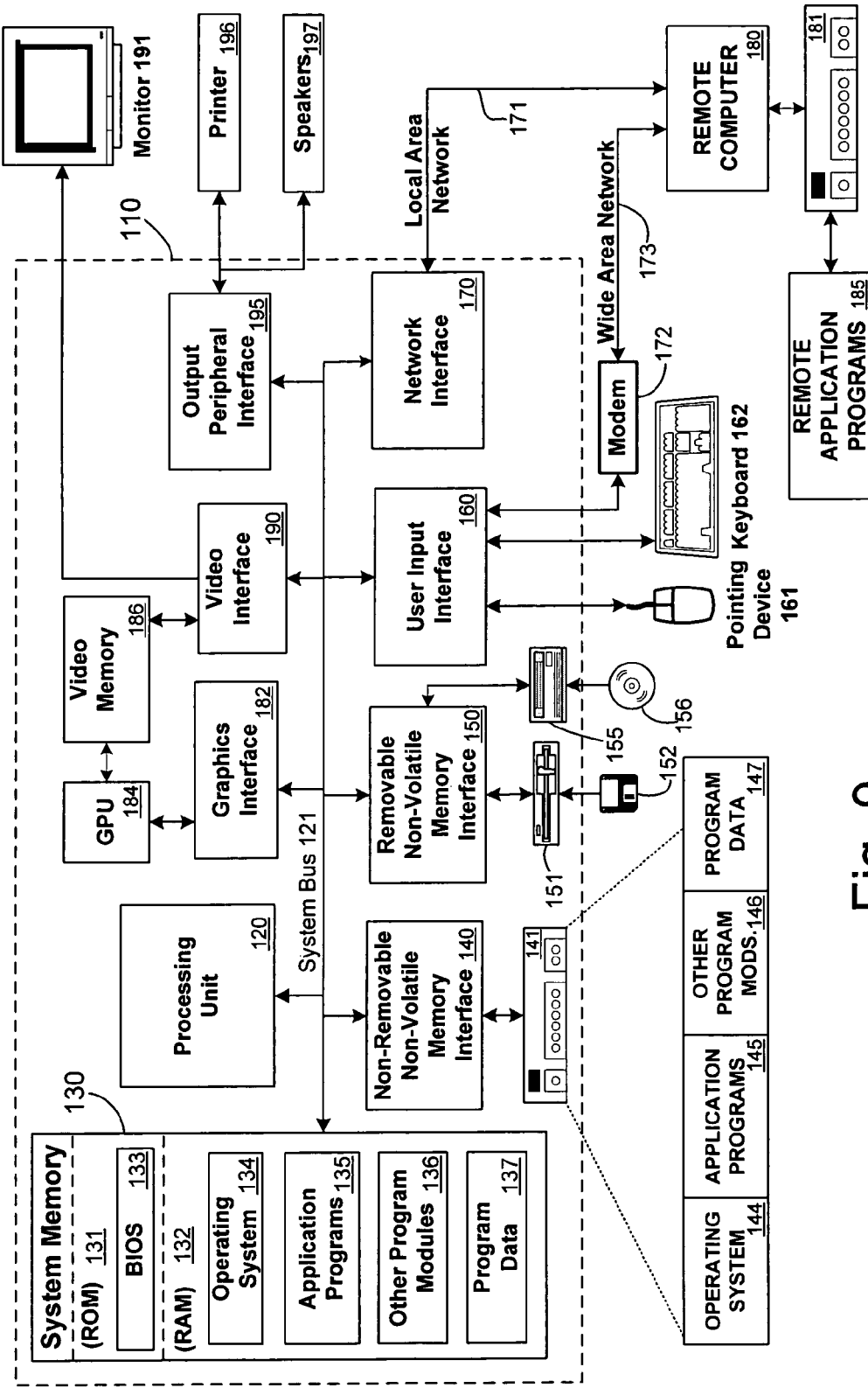
FIG. 9 is a block diagram representing an exemplary computing device in which the present invention may be implemented.

FIG. 9 thus illustrates an example of a suitable computing system environment 900 in which the invention may be implemented, although as made clear above, the computing system environment 900 is only one example of a suitable computing environment and is not intended to suggest any limitation as to the scope of use or functionality of the invention. Neither should the computing environment 900 be interpreted as having any dependency or requirement relating to any one or combination of components illustrated in the exemplary operating environment 900.

With reference to FIG. 9, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 9 illustrates operating system 134, application programs 135, other program modules 136, and program data 137.

The computer 110 may also include other removable/non-removable, volatile/nonvolatile computer storage media. By way of example only, FIG. 8 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-RW, DVD-RW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 9 provide storage of computer readable instructions, data structures, program modules and other data for the computer 110. In FIG. 9, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, such as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182 may also be connected to the system bus 121. One or more graphics processing units (GPUs) 184 may communicate with graphics interface 182. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 9. The logical connections depicted in FIG. 9 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 9 illustrates remote application programs 185 as residing on memory device 181. It will be appreciated that the network connections shown are exemplary and other means of establishing a communications link between the computers may be used.

CONCLUSION

Thus, systems and methods for model based generation of API test code have been disclosed. While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather should be construed in breadth and scope in accordance with the appended claims.

What is claimed:

1. A computer implement method for providing test code for testing an application programming interface, the method comprising:
   receiving a test model that depicts sequencing dependencies among a set of test functions as a set of paths;
   receiving a property sheet that defines argument configurations for the test functions;
   slicing the test model into test cases in accordance with the sequencing dependencies, each test case corresponding to one of the paths depicted in the test model;
   for each test case, generating a linear sequence of the test code in accordance with the argument configurations;
   generating a test plan that describes how the test code will be implemented to test the application programming interface;
   receiving an indication of whether the test plan is satisfactory;
   if the test plan is satisfactory, then generating the test code; and
   if the test plan is not satisfactory,
      receiving at least one of an updated test model and an updated property sheet; and
      generating the test code in accordance with at least one of the updated test model and the updated property sheet.

2. The method of claim 1, further comprising providing a diagramming interface that enables the test model to be diagrammed.

3. The method of claim 1, further comprising providing one of a spreadsheet interface and a word processor interface that enables the property sheet to be generated.

4. The method of claim 1, comprising generating the linear sequence of the test code by referencing information stored in a set of customizable macro-libraries.

5. The method of claim 1, further comprising:
receiving at least one condition that must be satisfied to proceed through at least one sequence of the test functions; and
for at least one corresponding test case, generating the linear sequence of the test code in accordance with the condition.

6. A system for providing test code for testing an application programming interface, the system comprising:
a processor;
a memory;
a diagramming interface that enables a test model to be diagrammed, the test model depicting sequencing dependencies among a set of test functions as a set of paths;
a second interface that enables a property sheet to be generated, the property sheet defining argument configurations for the test functions; and
a test code generator that receives the test model and the property sheet, slices the test model into test cases in accordance with the sequencing dependencies, each test case corresponding to one of the paths depicted in the test model, for each test case, generates a linear sequence of the test code in accordance with the argument configurations, generates a test plan that describes how the test code will be implemented to test the application programming interface, receives an indication of whether the test plan is satisfactory, generates the test code if the test plan is satisfactory, and, if the test plan is not satisfactory, receives at least one of an updated test model and an updated property sheet from at least one of the diagramming interface and the second interface and generates the test code in accordance with at least one of the updated test model and the updated property sheet.

7. The system of claim 6, wherein the second interface is one of a spreadsheet interface and a word processor interface.

8. The system of claim 6, further comprising a set of customizable macro-libraries from which the test code generator references information to generate the test code.

9. The system of claim 6, wherein the sequencing dependencies comprise at least one condition that must be satisfied to proceed through a sequence of the test functions.

10. The system of claim 9, wherein the test code generator generates the test code in accordance with the condition.

11. A computer-readable storage medium having computer-executable instructions for performing steps comprising:
receiving a test model that depicts sequencing dependencies among a set of test functions as a set of paths;
receiving a property sheet that defines argument configurations for the functions that are used to test an application programming interface;
slicing the test model into test cases in accordance with the sequencing dependencies, each test case corresponding to one of the paths depicted in the test model;
for each test case, generating a linear sequence of test code in accordance with the argument configurations;
for each linear sequence of the test code, generating a test plan that describes how to implement the test code to test the application programming interface;
receiving an indication of whether the test plan is satisfactory;
if the test plan is satisfactory, then generating the test code;
if the test plan is not satisfactory, then:
receiving at least one of an updated test model and an updated property sheet; and
generating the test code in accordance with at least one of the updated test model and the updated property sheet;
repeating the steps of receiving the property sheet, slicing the test model into test cases, generating the linear sequences of test code, generating the test plans, and receiving the indication of whether the test code is satisfactory until an indication that the test code is satisfactory is received; and
in response to receiving the indication that the test code is satisfactory, submitting the test code to a test computer for execution.

12. The computer-readable storage medium of claim 11, wherein the step of receiving the test model comprises receiving the test model that is diagrammed using a diagramming interface.

13. The computer-readable storage medium of claim 11, wherein the step of receiving the property sheet comprises receiving the property sheet that is generated using one of a spreadsheet interface and a word processor interface.

14. The computer-readable storage medium of claim 11, having further computer-executable instructions for generating the test plan as an electronic document that can be displayed using at least one of the spreadsheet interface and the word processor interface.

15. The computer-readable storage medium of claim 11, wherein the step of generating the linear sequence of the test code comprises generating the linear sequence of the test code by referencing information stored in a set of customizable macro-libraries.

16. The computer-readable storage medium of claim 11, having further computer-executable instructions for performing the steps of:
receiving at least one condition that must be satisfied to proceed through at least one sequence of the test functions; and
for at least one corresponding test case, generating the linear sequence of the test code in accordance with the condition.

* * * * *